United States Patent
Chepel et al.

(10) Patent No.: US 10,152,390 B1
(45) Date of Patent: Dec. 11, 2018

(54) INCREASING SPEED OF FILE RESTORE

(71) Applicants: Dmitry Chepel, Moscow (RU); Serguei M. Beloussov, Costa Del Sol (SG); Maxim V. Lyadvinsky, Moscow (RU); Stanislav Protasov, Moscow (RU)

(72) Inventors: Dmitry Chepel, Moscow (RU); Serguei M. Beloussov, Costa Del Sol (SG); Maxim V. Lyadvinsky, Moscow (RU); Stanislav Protasov, Moscow (RU)

(73) Assignee: ACRONIS INTERNATIONAL GMBH, Shaffhausen (CH)

( * ) Notice: Subject to any disclaimer, the term of this patent is extended or adjusted under 35 U.S.C. 154(b) by 0 days.

(21) Appl. No.: 14/457,767

(22) Filed: Aug. 12, 2014

Related U.S. Application Data

(63) Continuation-in-part of application No. 14/320,393, filed on Jun. 30, 2014, and a continuation-in-part of application No. 14/320,409, filed on Jun. 30, 2014, and a continuation-in-part of application No. 14/320,422, filed on Jun. 30, 2014, and a continuation-in-part of application No. 14/320,450, filed on Jun. 30, 2014, and a continuation-in-part of application No. 14/320,496, filed on Jun. 30, 2014, and a continuation-in-part of application No. 14/320,510, filed on Jun. 30, 2014, and a continuation-in-part of application No. 14/320,526, filed on Jun. 30, 2014, and a continuation-in-part of application No. 14/320,540, filed on Jun. 30, 2014, and a continuation-in-part of application No. 14/320,546, filed on Jun. 30, 2014, and a continuation-in-part of application No. 14/320,555, filed on Jun. 30, 2014.

(Continued)

(51) Int. Cl.
 *G06F 11/14* (2006.01)

(52) U.S. Cl.
 CPC ...... *G06F 11/1458* (2013.01); *G06F 2201/80* (2013.01)

(58) Field of Classification Search
 CPC .............. G06F 11/1458; G06F 2201/80
 USPC .................................. 709/220–222
 See application file for complete search history.

(56) References Cited

U.S. PATENT DOCUMENTS 6,023,710 A * 2/2000 Steiner .............. G06F 17/30067
 707/999.204
6,128,728 A * 10/2000 Dowling .................. G06F 9/462
 710/22

(Continued)

*Primary Examiner* — Minh Chau Nguyen
(74) *Attorney, Agent, or Firm* — K&L Gates LLP

(57) ABSTRACT

A method, computer program product, computing system, and system for increasing speed of a file restore from an archive storage device are described. The method may include receiving, at a computing device, a list of files to be restored from the archive storage device and file location data associated with one or more files from the list of files to be restored. The method may further include determining, at the computing device, a file restoration sequence for the one or more files from the list of files to be restored based upon, at least in part, the file location data. The method may also include restoring, from the archive storage device, the one or more files from the list of files to be restored based upon, at least in part, the file restoration sequence.

16 Claims, 5 Drawing Sheets

Related U.S. Application Data

(60) Provisional application No. 61/869,467, filed on Aug. 23, 2013, provisional application No. 61/869,470, filed on Aug. 23, 2013, provisional application No. 61/869,480, filed on Aug. 23, 2013.

(56) References Cited

U.S. PATENT DOCUMENTS

| | | | |
|---|---|---|---|
| 7,047,380 B2 | 5/2006 | Tormasov et al. | |
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |
| 7,366,859 B2 | 4/2008 | Per et al. | |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,180,984 B1 | 5/2012 | Per et al. | |
| 8,200,638 B1 * | 6/2012 | Zheng | G06F 11/1464 707/679 |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,484,427 B1 | 7/2013 | Lyadvinsky et al. | |
| 8,645,748 B1 | 2/2014 | Chepel et al. | |
| 8,732,121 B1 | 5/2014 | Zorin et al. | |
| 8,856,927 B1 | 10/2014 | Beloussov et al. | |
| 8,996,830 B1 | 3/2015 | Lyadvinsky et al. | |
| 2001/0034737 A1 * | 10/2001 | Cane | G06F 11/1451 707/999.204 |
| 2006/0225065 A1 | 10/2006 | Chandhok et al. | |
| 2009/0319736 A1 * | 12/2009 | Otani | G06F 17/30073 711/162 |
| 2010/0011178 A1 | 1/2010 | Feathergill | |
| 2010/0332401 A1 * | 12/2010 | Prahlad | G06F 17/3002 705/80 |

* cited by examiner

INCREASING SPEED OF FILE RESTORE

CROSS REFERENCE TO PRIOR APPLICATIONS

This application claims priority to and the benefit of U.S. Provisional Patent Application No. 61/869,467, filed on Aug. 23, 2013; U.S. Provisional Patent Application 61/869,470, filed on Aug. 23, 2013; U.S. Provisional Patent Application No. 61/869,480, filed on Aug. 23, 2013, U.S. patent application Ser. No. 14/320,393, filed on Jun. 30, 2014; U.S. patent application Ser. No. 14/320,409, filed on Jun. 30, 2014; U.S. patent application Ser. No. 14/320,422, filed on Jun. 30, 2014; U.S. patent application Ser. No. 14/320,450, filed on Jun. 30, 2014; U.S. patent application Ser. No. 14/320,496, filed on Jun. 30, 2014; U.S. patent application Ser. No. 14/320,510, filed on Jun. 30, 2014; U.S. patent application Ser. No. 14/320,526, filed on Jun. 30, 2014; U.S. patent application Ser. No. 14/320,540, filed on Jun. 30, 2014; U.S. patent application Ser. No. 14/320,546, filed on Jun. 30, 2014; and U.S. patent application Ser. No. 14/320,555, filed on Jun. 30, 2014, the contents of each of which are hereby incorporated by reference in their entirety.

TECHNICAL FIELD

The technical field may generally relate to recovery of physical or virtual machines and more particularly to recovery of physical or virtual machine files.

BACKGROUND

Physical or virtual machines may run business critical or other applications. An entire physical or virtual machine or individual files or folders of the physical or virtual machine may fail. Such failure of a physical or virtual machine may interrupt normal availability and accessibility of the business critical or other applications. To restore availability and accessibility, recovery of the entire physical or virtual machine or individual files or folders may be necessary. In some situations, availability and accessibility of the business critical or other applications may be needed as soon as possible after a failure.

BRIEF SUMMARY

In an embodiment, a method for increasing speed of a file restore from an archive storage device may include receiving, at a computing device, a list of files to be restored from the archive storage device and file location data associated with one or more files from the list of files to be restored. The method may further include determining, at the computing device, a file restoration sequence for the one or more files from the list of files to be restored based upon, at least in part, the file location data. The method may also include restoring, from the archive storage device, the one or more files from the list of files to be restored based upon, at least in part, the file restoration sequence.

One or more of the following features may be included. The method may include reducing a number of requests from the archive storage device during the file restore by restoring files having adjacent locations first. The method may further include requesting the one or more files from the list of files to be restored in accordance with the file restoration sequence. The method may also include writing at least a portion of at least one of the requested files to a target system storage block corresponding to a block in the archived storage device associated with the requested files. The method may additionally include re-ordering an original sequence for the one or more files from the list of files to be restored based upon, at least in part, the file restoration sequence.

In an implementation, the file location data associated with the one or more files from the list of files to be restored may include data describing a location of the one or more files in a data stream at the archive storage device. The file location data may include file placement offset data associated with the one or more files from the list of files to be restored. Determining the file restoration sequence for the one or more files from the list of files to be restored may be based upon, at least in part, the file placement offset data.

In an embodiment, a computer program product may reside on a computer readable storage medium and may have a plurality of instructions stored on it. When executed by a processor, the instructions may cause the processor to perform operations for increasing speed of a file restore from an archive storage device. The operations may include receiving, at a computing device, a list of files to be restored from the archive storage device and file location data associated with one or more files from the list of files to be restored. The operations may further include determining, at the computing device, a file restoration sequence for the one or more files from the list of files to be restored based upon, at least in part, the file location data. The operations may also include restoring, from the archive storage device, the one or more files from the list of files to be restored based upon, at least in part, the file restoration sequence.

One or more of the following features may be included. The operations may include reducing a number of requests from the archive storage device during the file restore by restoring files having adjacent locations first. The operations may further include requesting the one or more files from the list of files to be restored in accordance with the file restoration sequence. The operations may also include writing at least a portion of at least one of the requested files to a target system storage block corresponding to a block in the archived storage device associated with the requested files. The method operations may additionally include re-ordering an original sequence for the one or more files from the list of files to be restored based upon, at least in part, the file restoration sequence.

In an implementation, the file location data associated with the one or more files from the list of files to be restored may include data describing a location of the one or more files in a data stream at the archive storage device. The file location data may include file placement offset data associated with the one or more files from the list of files to be restored. Determining the file restoration sequence for the one or more files from the list of files to be restored may be based upon, at least in part, the file placement offset data.

In an embodiment, a computing system for increasing speed of a file restore from an archive storage device may include one or more processors. The one or more processors may be configured to receive, at a computing device, a list of files to be restored from the archive storage device and file location data associated with one or more files from the list of files to be restored. The one or more processors may be further configured to determine, at the computing device, a file restoration sequence for the one or more files from the list of files to be restored based upon, at least in part, the file location data. The one or more processors may also be configured to restore, from the archive storage device, the one or more files from the list of files to be restored based upon, at least in part, the file restoration sequence.

One or more of the following features may be included. The one or more processors may be configured to reduce a number of requests from the archive storage device during the file restore by restoring files having adjacent locations first. The one or more processors may further be configured to request the one or more files from the list of files to be restored in accordance with the file restoration sequence. The one or more processors may also be configured to write at least a portion of at least one of the requested files to a target system storage block corresponding to a block in the archived storage device associated with the requested files. The one or more processors may additionally be configured to include re-order an original sequence for the one or more files from the list of files to be restored based upon, at least in part, the file restoration sequence.

In an implementation, the file location data associated with the one or more files from the list of files to be restored may include data describing a location of the one or more files in a data stream at the archive storage device. The file location data may include file placement offset data associated with the one or more files from the list of files to be restored. Determining the file restoration sequence for the one or more files from the list of files to be restored may be based upon, at least in part, the file placement offset data.

In an embodiment, a system for increasing speed of a file restore from an archive storage device may include a data stream at the archive storage device. The system may further include a computing device that receives a list of files to be restored from the data stream at the archive storage device. The system may also include a metadata stream at the archive storage device. The computing device may receive file placement offset data from the metadata stream. The file placement offset data may be associated with one or more files from the list of files to be restored. The system may additionally include a file restoration sequence for the one or more files from the list of files to be restored. The file restoration sequence may be determined based upon, at least in part, the file placement offset data.

The details of one or more implementations are set forth in the accompanying drawings and the description below. Other features and advantages will become apparent from the description, the drawings, and the claims.

DETAILED DESCRIPTION

Overview

A cloud provider or system administrator may institute backup and recovery procedures to ensure persistence of applications, data, or other resources accessed through one or more physical or virtual machines. For example, a backup archive of the physical or virtual machine may be created and stored onsite or offsite and may include the entire content of the physical or virtual machine before it failed. Efficient recovery of physical or virtual machines may be critical for proper business or other operations of an organization as application demands are likely to continue in the event of a physical or virtual machine failure. Under certain circumstances, recovery can be impeded as a result of network limitations or high latency storage.

General backup and recovery workflow may be used to get a physical or virtual machine system (and corresponding applications) up and running after a failure. Upon failure, files may be recovered from previously created backups. Some restore operations on archived data may implement a file restoration order which may be defined by a metadata structure. In some systems, the files may be restored file by file. The first file to be restored may be selected according a first metadata record in a metadata list. This, a file restoration order may depend on a metadata list structure and order.

In some situations, reducing the time between the failure or data loss and its recovery may be a primary business goal. Recovery of the physical or virtual machine files may be performed by transferring files from a backup archive to a physical or virtual machine via a network, which may take more time than desired.

In view of the forgoing, there may be a need for a system in which the speed of a file restore is increased. In various implementations, the techniques and features described in the present disclosure are directed towards increasing the speed of a physical or virtual machine file restore. In some systems, the techniques and features described herein may be used to analyze file placement and/or offset and reorder a file restoration sequence for a restore to reduce a count of requests and reduce restore and/or copy time.

Figure 1:
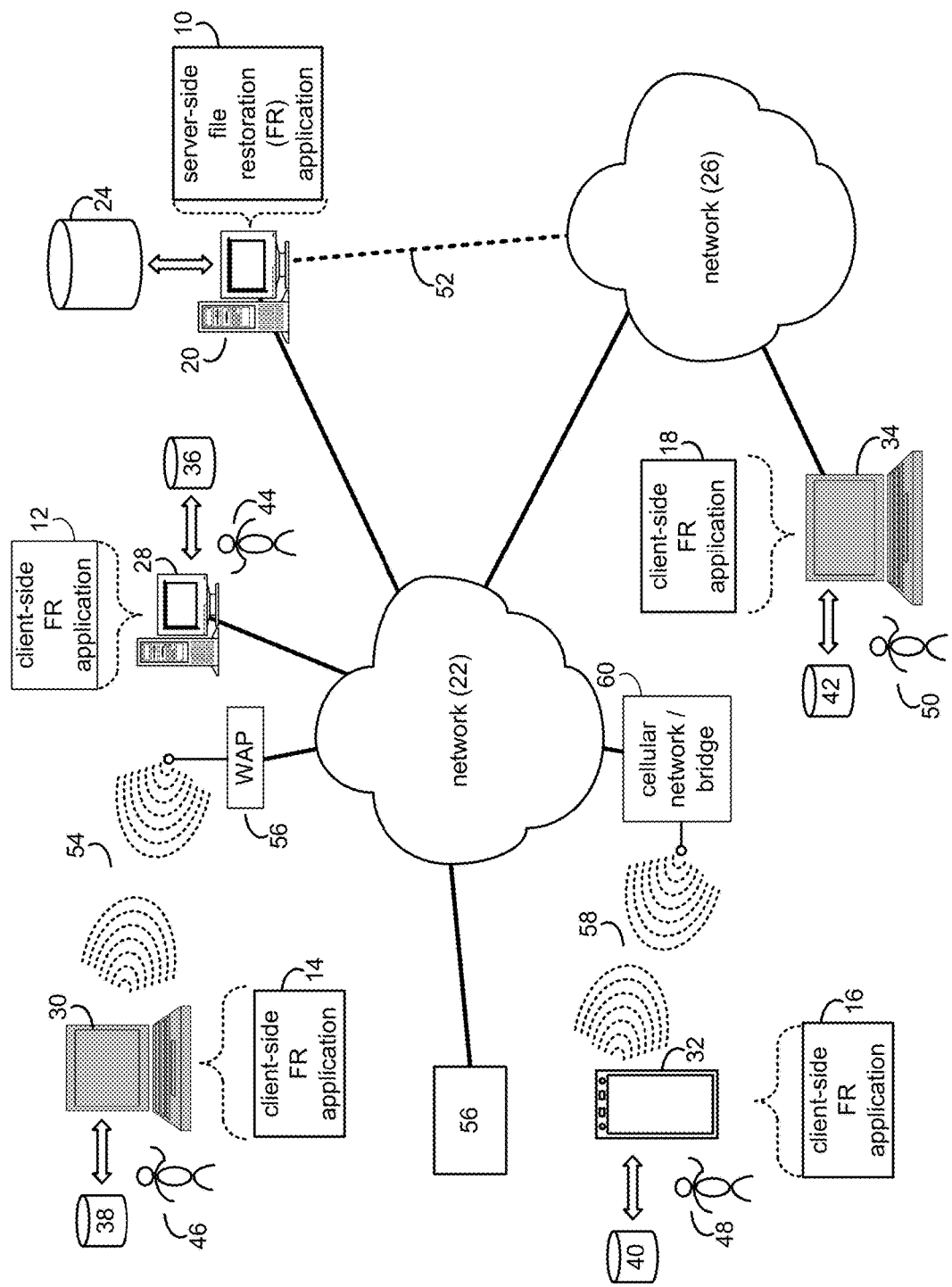
FIG. 1 depicts an example system that can execute implementations of the present disclosure.

Referring to FIG. 1, there is shown a server-side file restoration (FR) application 10 and client-side FR applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as file restoration process 10. Further, one or more of client applications 12, 14, 16, and 18 may be referred to as a process configured to carry out one or more of the features described herein, such as file restoration processes 12, 14, 16, and/or 18.

Figure 5:
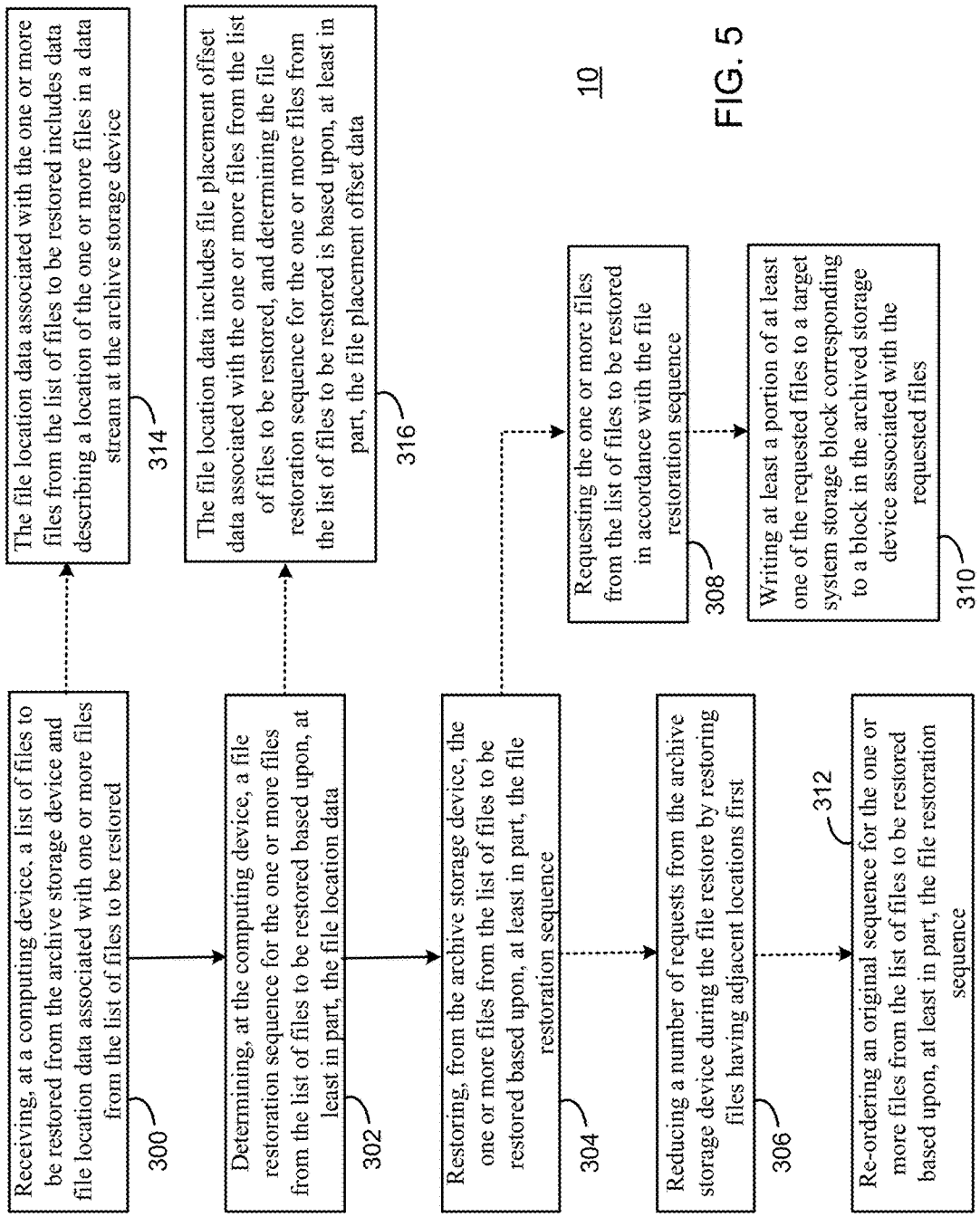
FIG. 5 is a flowchart illustrating an example process for increasing speed of a file restore in accordance with the present disclosure.

As will be discussed below and referring now to FIG. 5, file restoration process or application 10 may receive 300 a list of files to be restored from the archive storage device and may also receive file location data associated with one or more files from the list of files to be restored. File restoration process 10 may also determine 302 a file restoration sequence for the one or more files from the list of files to be restored based upon, at least in part, the file location data. File restoration process 10 may further restore 304 the one or more files from the list of files to be restored based upon, at least in part, the file restoration sequence.

The file restoration process may be a server-side process (e.g., server-side file restoration process 10), a client-side process (e.g., client-side file restoration process 12, client-side file restoration process 14, client-side file restoration process 16, or client-side file restoration process 18), or a hybrid server-side/client-side process (e.g., a combination of server-side file restoration process 10 and one or more of client-side file restoration processes 12, 14, 16, 18).

System Overview

Referring to FIG. 1, server-side file restoration process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side file restoration process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side file restoration processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side file restoration processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side file restoration processes 12, 14, 16, 18 and/or server-side file restoration process 10 may be processes that run within (i.e., are part of) a cloud computing site, cloud computing application, cloud platform, or cloud environment. Alternatively, client-side file restoration processes 12, 14, 16, 18 and/or server-side file restoration process 10 may be stand-alone applications that work in conjunction with the cloud computing site, cloud computing application, cloud platform, or cloud environment. One or more of client-side file restoration processes 12, 14, 16, 18 and server-side file restoration process 10 may interface with each other (via network 22 and/or network 26).

Users 44, 46, 48, 50 may access server-side file restoration process 10 directly through the device on which the client-side file restoration process (e.g., client-side file restoration processes 12, 14, 16, 18) is executed, namely client electronic devices 28, 30, 32, 34, for example. Users 44, 46, 48, 50 may access server-side file restoration process 10 directly through network 22 and/or through secondary network 26. Further, server computer 20 (i.e., the computer that executes server-side file restoration process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

File Restoration Process

For the following discussion, server-side file restoration process 10 will be described for illustrative purposes and server computer 20 may run server-side file restoration application 10 to carry out some or all of the techniques and features described here. It should be noted that server-side file restoration process 10 may interact with client-side file restoration process 12 and may be executed within one or more applications that allow for communication with client-side file restoration process 12. However, this is not intended to be a limitation of this disclosure, as other configurations are possible (e.g., stand-alone, client-side file restoration processes and/or stand-alone server-side file restoration processes). For example, some implementations may include one or more of client-side file restoration processes 12, 14, 16, and 18 in place of or in addition to server-side file restoration process 10.

The systems and methods (e.g., file restoration process 10) described herein relate to the recovery of physical or virtual machines and/or physical or virtual machine files. In part, the systems and methods relate to decreasing the recovery time period for restoring a physical or virtual machine or physical or virtual machine files and, more specifically, overcoming high latency storage issues.

The systems described herein may include one or more memory elements for backup of software, databases, and physical or virtual machines, and computer storage products including instructions to be executed by a processor to cause the processor to implement the methods described herein.

Figure 2:
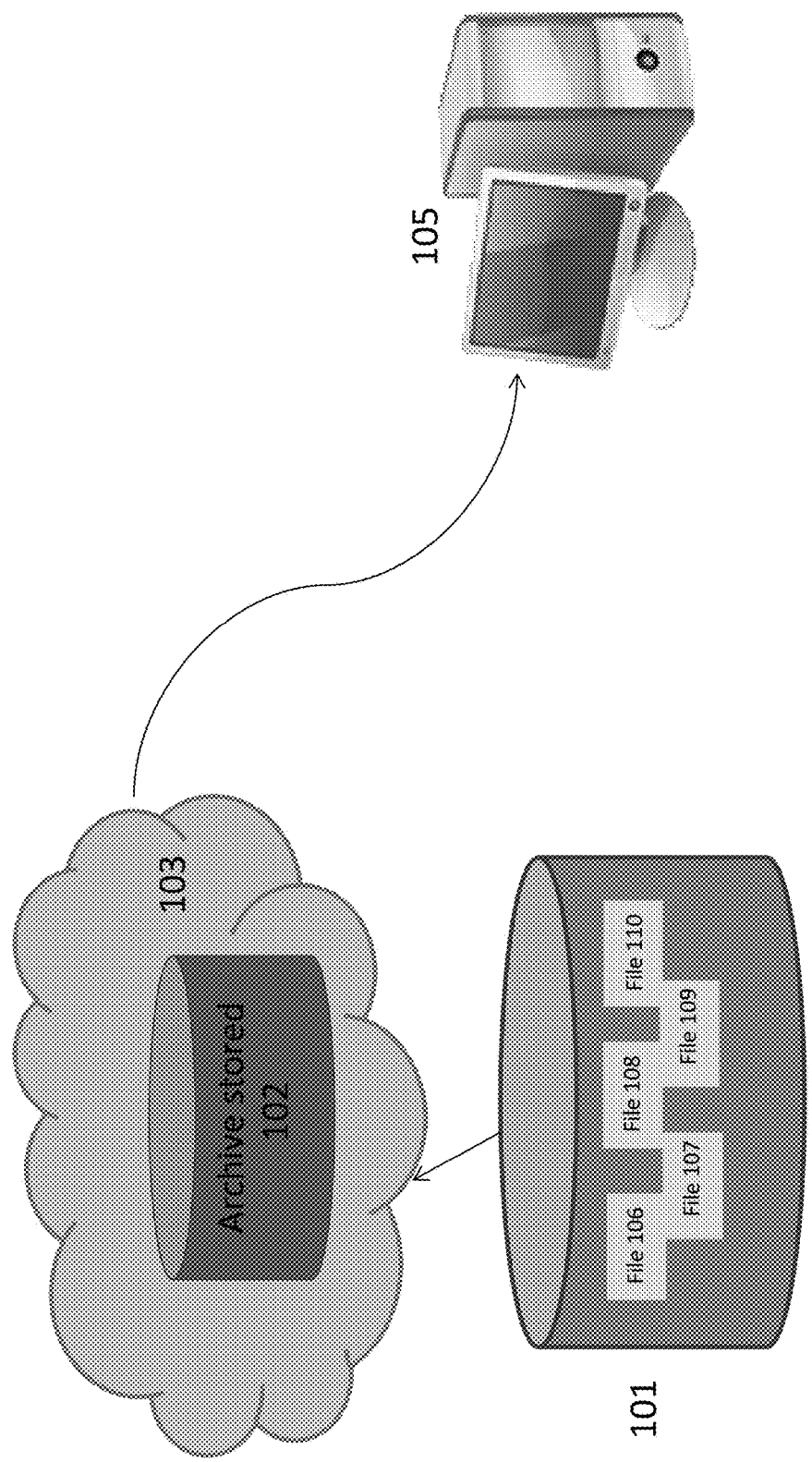
FIG. 2 also depicts an example system in accordance with the present disclosure.

Referring now to FIG. 1, one or more of users 44, 46, 48, and 50 may be cloud administrators or system administrators or may be cloud or system end-users. Referring now also to FIG. 2, the cloud or system administrators may access and administer computing device 105 through one or more of server computer 20 or client electronic devices 28, 30, 32, 34 (respectively). In an embodiment, computing device 105 may be a physical computer system or virtualization host device. The virtualization host device may include a virtual machine and may run a cloud or virtualization application such as VMWare™ or may include a bare-metal embedded hypervisor (e.g. VMware™ ESX™ and VMware™ ESXi™). Further, the virtualization host device may include a vCloud™ architecture that may enhance cooperation between hypervisors. File restoration process 10 may include or may work in connection with an agent (e.g., a software module), which may include or may be configured to perform any number of the techniques or features described herein.

File restoration process 10 may include a software component, executable code, function, subroutine, or other set of instructions designed to carry out one or more operations for file restoration. File restoration process 10 may coordinate a file restore and, in an embodiment, may require a separate machine where it can be run. This machine may be, for example, a virtual appliance, a Windows/Linux virtual machine, or a Windows/Linux physical machine, where the executable code of file restoration process 10 can be executed.

The physical or virtual machine may run, for example, business critical applications for which physical or virtual machine files may need to be recovered or restored upon a failure. The physical or virtual machine files may have been backed up before the failure. For example, the physical or virtual machine files may have been backed up to an archive storage device where the files are available for restore upon a failure. Referring now to FIG. 2, the initial data (e.g., data 101) of the system to be backed up may include several files. The system may include files 106, 107, 108, 109, and/or 110, which may be document files, audio files, video files, etc. The files may have been stored in an order. Data 101 (including, e.g., files 106, 107, 108, 109, and/or 110) may be archived (e.g., backed up or copied) into archive storage device 102 which may be part of storage 103. Storage 103 may be, for example, cloud storage. Archive storage device 102 and storage 103 are shown for illustrative purposes only, and other configurations are possible. For example, storage 103 may be a storage device including a portion of storage described as archive storage 102.

In some situations, storage 103 may have high latency and may cause delay during a restoration process. Thus, restoring archived data from storage 103 to physical or virtual machine 105 using conventional methods may take an undesirable amount of time, as described above.

A system may be able to perform some operations in connection with the archive storage device. For example the system may be able to create a backup archive of the physical or virtual machine and store it at the archive storage device. The system may also be able to perform a restore operation to restore the backup archive contents upon failure of the physical or virtual machine. Some or all of the backup archive contents (original files) may be selected for restore.

In some systems, the restore operation may use metadata items in the scope of the restore (e.g., the files to be restored). A restore algorithm may select an item, may extract information about a nonresident attribute (e.g., file placement), and may download attribute data and restore the corresponding data or files.

The archive storage device may include data and metadata. The data may be or may represent the physical or virtual machine files. The metadata may describe how the physical or virtual machine files are organized in the archive storage device. The metadata may include a set of items. An item may describe a file and may have attributes stored therein. The system may analyze metadata items while gathering information about item placement. The metadata items may also be files. The system may further determine a restore and copy file sequence. To reduce a number of requests, the system may join file fragments having adjacent locations in storage. Further, the system may download the backup files/data in sequence in accordance with the restore and copy file sequence.

Items of metadata may include the name, size, hash, offset and size fragment related to the data in a data stream. Using the techniques and features described herein, the speed of restoration may be improved by optimizing the order of files and/or file blocks restored.

The data stream may be a data part of a backup archive. The data stream may be a data file (i.e., a file with backed up data) and may be a more general concept than a file. In some systems, file restoration process 10 may be used to analyze file placement and/or offset and reorder a file restoration sequence for a restore to reduce a count of requests and reduce restore and/or copy time. Efficiency may be gained when fragmented files can be joined for restore and spread on storage. For example, when files are backed up, they may be placed it into a resulting archive stream. If a portion of those backed up files are selected for restore and were not stored sequentially during the back up, the files may be spread out on the storage device.

In the case of a virtual machine, a virtualization host device may include a file system datastore which may be based on VMFS (virtual machine file system). The datastore may include one or more virtual disks which may be a virtual machine disk (VMDK or .vmdk) file. The virtual disk may be a single disk file including the constituent data for an entire virtual machine, which may be backed up for restore at the archive storage device. The file system datastore may be a logical representation of the storage provided by virtualization host device.

Figure 3:
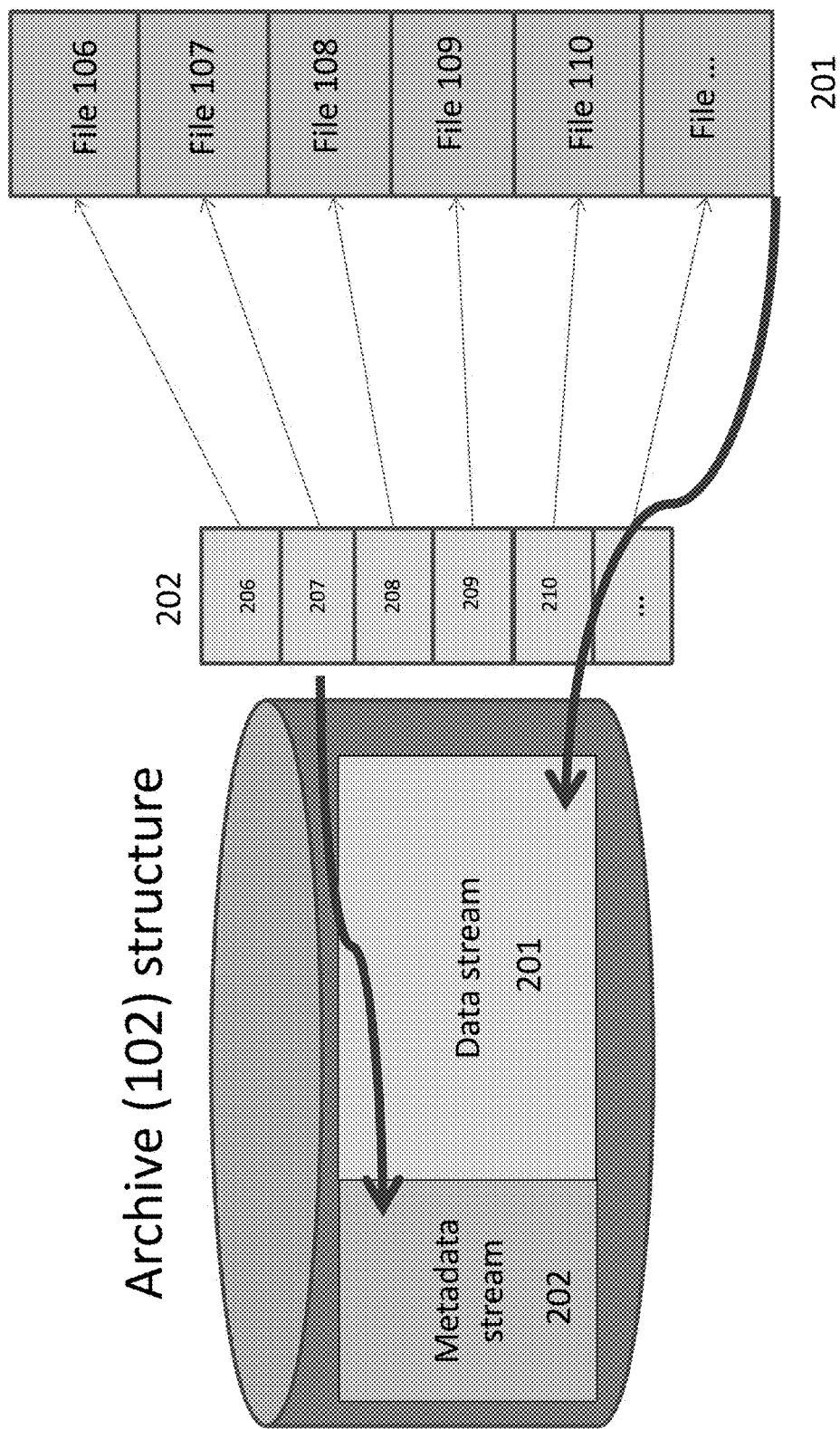
FIG. 3 depicts an example memory structure in accordance the present disclosure.

Referring now to FIGS. 2 and 3, an example archive storage device 102 is shown. Archive storage device 102 may be split into two parts (e.g., two files or two types of files). One file may include meta information or metadata (e.g., meta stream 102) and may include a set of items. An item may describe a file. The item may have some attributes stored in the file called resident attributes and other attributes may be placed into an external file called nonresident attributes. Nonresident attributes may include information about placement of the file, and the nonresident attributes are placed in a metadata file. For example, resident attributes may relate to metadata and nonresident attributes may relate to data (i.e., file content). An item may be a combination of several attributes.

Figure 4:
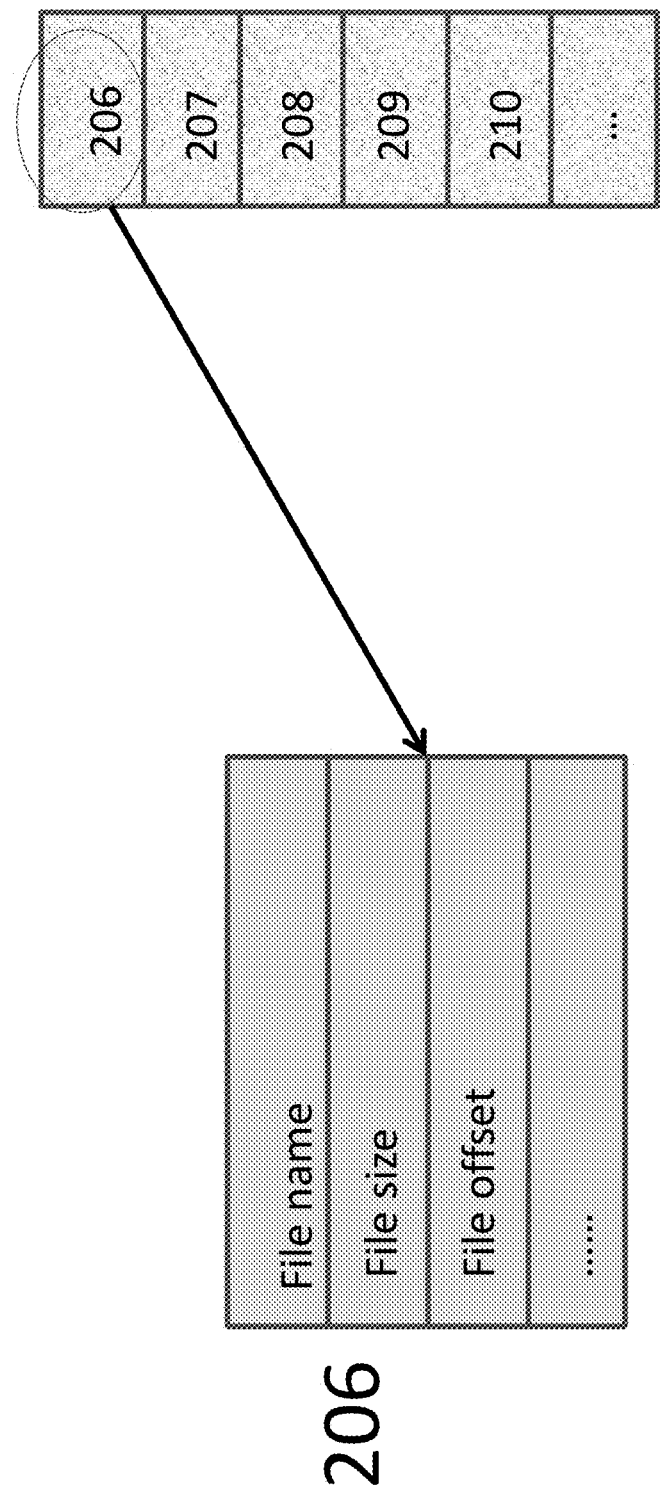
FIG. 4 depicts an example metadata structure in accordance with the present disclosure.

Referring now to FIG. 3, metadata entries 206, 207, 208, 209, and 210 of meta stream 202 may include information describing files 106, 107, 108, 109, and 110 of data stream 201. For example, as shown in FIG. 4, the metadata entry (e.g., metadata entry 206) may store and may include information about a corresponding file such as file name, file size, and file offset (e.g., of file 106). The metadata entry may also include the file number, where the file was located initially, hash, etc.

Referring now to FIGS. 1-5, in an embodiment, file restoration process 10 may receive 300 a list of files (e.g., one or more of 106, 107, 108, 109, and 110) to be restored from the archive storage device (e.g., archive storage device 102). File restoration process 10 may also receive 300 file location data associated with one or more files (e.g., one or more of 106, 107, 108, 109, and 110) from the list of files to be restored. The file location data associated with the one or more files (e.g., one or more of 106, 107, 108, 109, and 110) from the list of files to be restored may include (314) data describing a location of the one or more files in a data stream (e.g., data stream 201) at the archive storage device (e.g., archive storage device 102). For example, the file location data may include a file (placement) offset of file 106 in data stream 201 at archive storage device 102, as shown in FIG. 4.

Further, file restoration process 10 may determine 302 a file restoration sequence for the one or more files (e.g., one or more of 106, 107, 108, 109, and 110) from the list of files to be restored based upon, at least in part, the file location data. The file location data may include (316) file placement offset data associated with the one or more files (e.g., one or more of 106, 107, 108, 109, and 110) from the list of files to be restored. Further, determining the file restoration sequence for the one or more files from the list of files to be restored may be based upon, at least in part, the file placement offset data. For example, file restoration process 10 may read file placement offsets from metadata items in metadata stream 202 and may reorder input and/or read operations for restoring the files according to the file placement offsets. In this way, file restoration process 10 may form a restoration strategy or scheme to reduce time for input operations.

For example, file restoration process 10 may extract information about file nonresident attributes and may download attribute data and analyze the files by order of placement. File restoration process 10 may read metadata items to get information about file placement offset, and may form a plan for the sequence of input operations to restore/copy files. In this way, file restoration process 10 may re-order 312 an original sequence for the one or more files (e.g., one or more of 106, 107, 108, 109, and 110) from the list of files to be restored based upon, at least in part, the file restoration sequence.

File restoration process 10 may restore 304 the one or more files (e.g., one or more of 106, 107, 108, 109, and 110) from the list of files to be restored based upon, at least in part, the file restoration sequence. The number of requests may be reduced by joining file fragments having an adjacent location in the archive storage (e.g., archive storage device 102). An adjacent location may be defined in terms of physical addresses of files and/or file blocks and/or file fragments. In this way, file restoration process 10 may reduce 306 a number of requests from the archive storage device during the file restore by restoring files having adjacent locations first.

Determining whether files are at adjacent locations or are sufficiently adjacent may include analyzing various characteristics and/or metrics of hardware (e.g., archive storage device 102). For example, two files in a hard drive (e.g., archive storage device 102) may be adjacent if their file placement offsets point to address areas located one after the other.

Restoring the one or more files (e.g., one or more of 106, 107, 108, 109, and 110) may include multiple operations. For example, file restoration process 10 may request 308 the one or more files (e.g., one or more of 106, 107, 108, 109, and 110) from the list of files to be restored in accordance with the file restoration sequence. Further, file restoration process 10 may write 310 at least a portion of at least one of the requested files to a target system (e.g., physical or virtual machine 105) storage block corresponding to a block in the archived storage device (e.g., archived storage device 102) associated with the requested files. The storage block corresponding to the block in the archived storage device (e.g., archived storage device 102) may be a matched block. File restoration process 10 may repeat this process until all requested files are restored.

One or more of the techniques and features described herein may be modeled. For example, a system may have N files (files 106, 107, 108, 109, and 110). The files may be distributed into M blocks (e.g., at archived storage device 102) where N is greater than M.

Further, Access to Block Time $T=(T_{latency}+S_{block}/V_{download})$, where $T_{latency}$ is the time to access to the data, $S_{block}$ is the size of the block which includes an uninterruptable sequence of files (e.g., files exist sequentially in the data stream), $V_{download}$ is the download speed, and $S_{file}$ is the average file size. Thus, the time to download all requested files may be represented by:

T1=$N*T_{latency}+N*S_{file}/V_{download}$ (in a case where the original, conventional restore sequence is used);

(ii) T2=$M*T_{latency}+M*S_{block}/V_{download}$ (in a case where the second case determined file restoration sequence described here in is used); and (iii) $M*S_{block}=N*S_{file}$ (i.e., size of transmitted data may be unchanged if files exist sequentially in a data stream); such that:

(iv) $T_{win}=T_1-T_2=(N-M)*T_{latency}$ (where $T_{win}$ may be the amount of time saved using the techniques and features described herein).

In an implementation, files may be downloaded through multiple download streams to increase speed of the restore. Further, a client may request the next block to restore before the previous block or file being restored has been downloaded, which may increase throughput and increase speed of the restore. Also, in an implementation, $S_{block}$ may be increased by reading a short hole that includes unrequested data or files not requested for restore. In this case, unnecessary data may be restored but time may be saved. For example, if $S_{hole}/V_{download}>T_{latency}$ the short hole may also be downloaded and restored to save time.

Also, in an implementation, the techniques and features described herein may be combined with synchronization acceleration technology using a partial local source. Further, due to limitations in memory when analyzing the data to be restored, the total scope of data may be downloaded in separate parts. Also, fragments may be placed in the file system immediately or fragments may be buffered into RAM or the file system. Additionally, if files are fragmented, additional time maybe saved by joining fragmented files with other fragmented files. For example, data may be placed in RAM temporarily and then subsequently restored from the RAM, if, for example, the data stream could not be processed for some reason (e.g., if it were ciphered).

Moreover, in an implementation, a local archive may be prepared for future restore by extracting metadata information ahead of time. A network archive pack operation may also be executed to save time during restore. For example, a special directory may need to be restored in the future or incremental backups may need to be restored. In this case, it may not be necessary to download all files from a total backup. The last state of the archive may be downloaded and files may be restored from there accordingly.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl.

Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology.

The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or inter-network generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for restoring data from an archive storage device, the method comprising:
  receiving, at a computing device, a list of N files to be restored from the archive storage device and file location data associated with one or more files from the list of N files to be restored;
  determining, at the computing device, a file restoration sequence for the one or more files from the list of N files to be restored based upon, at least in part, the file location data;
  increasing speed of restoring the N files by an amount T, wherein the N files are distributed into M blocks by reducing a number of requests from the archive storage device during the file restore by joining file fragments having adjacent locations, wherein T equals $(N-M)*T_{latency}$, wherein $T_{latency}$ is time to access data being restored; and
  restoring, from the archive storage device, the one or more files from the list of N files to be restored based upon, at least in part, the file restoration sequence.

2. The method of claim 1, wherein restoring the one or more files from the list of N files to be restored comprises:
  requesting the one or more files from the list of N files to be restored in accordance with the file restoration sequence; and
  writing at least a portion of at least one of the requested files to a target system storage block corresponding to a block in the archived storage device associated with the requested files.

3. The method of claim 1, further comprising:
  re-ordering an original sequence for the one or more files from the list of N files to be restored based upon, at least in part, the file restoration sequence.

4. The method of claim 1, wherein the file location data associated with the one or more files from the list of N files to be restored includes data describing a location of the one or more files in a data stream at the archive storage device.

5. The method of claim 1, wherein the file location data includes file placement offset data associated with the one or more files from the list of N files to be restored, and wherein determining the file restoration sequence for the one or more files from the list of N files to be restored is based upon, at least in part, the file placement offset data.

6. A computer program product residing on a computer readable storage medium having a plurality of instructions stored thereon, which, when executed by a processor, cause the processor to perform operations for restoring data from an archive storage device, the operations comprising:
  receiving, at a computing device, a list of N files to be restored from the archive storage device and file location data associated with one or more files from the list of N files to be restored;
  determining, at the computing device, a file restoration sequence for the one or more files from the list of N files to be restored based upon, at least in part, the file location data;
  increasing speed of restoring the N files by an amount T, wherein the N files are distributed into M blocks by reducing a number of requests from the archive storage device during the file restore by restoring files having adjacent locations first, wherein T equals $(N-M)*T_{latency}$, wherein $T_{latency}$ is time to access data being restored;
  restoring, from the archive storage device, the one or more files from the list of N files to be restored based upon, at least in part, the file restoration sequence.

7. The computer program product of claim 6, wherein restoring the one or more files from the list of N files to be restored comprises:
  requesting the one or more files from the list of N files to be restored in accordance with the file restoration sequence; and
  writing at least a portion of at least one of the requested files to a target system storage block corresponding to a block in the archived storage device associated with the requested files.

8. The computer program product of claim 6, wherein the operations further comprise:
   re-ordering an original sequence for the one or more files from the list of N files to be restored based upon, at least in part, the file restoration sequence.

9. The computer program product of claim 6, wherein the file location data associated with the one or more files from the list of N files to be restored includes data describing a location of the one or more files in a data stream at the archive storage device.

10. The computer program product of claim 6, wherein the file location data includes file placement offset data associated with the one or more files from the list of N files to be restored, and wherein determining the file restoration sequence for the one or more files from the list of N files to be restored is based upon, at least in part, the file placement offset data.

11. A computing system for increasing speed of a file restore from an archive storage device, the computing system comprising one or more processors, wherein the one or more processors are configured to:
   receive, at a computing device, a list of N files to be restored from the archive storage device and file location data associated with one or more files from the list of N files to be restored;
   determine, at the computing device, a file restoration sequence for the one or more files from the list of N files to be restored based upon, at least in part, the file location data;
   increase speed of restoring the N files by an amount T, wherein the N files are distributed into M blocks by reducing a number of requests from the archive storage device during the file restore by joining file fragments having adjacent locations, wherein T equals $(N-M)*T_{latency}$, wherein $T_{latency}$ is time to access data being restored;
   restore, from the archive storage device, the one or more files from the list of N files to be restored based upon, at least in part, the file restoration sequence.

12. The computing system of claim 11, wherein restoring the one or more files from the list of N files to be restored comprises:
   requesting the one or more files from the list of N files to be restored in accordance with the file restoration sequence; and
   writing at least a portion of at least one of the requested files to a target system storage block corresponding to a block in the archived storage device associated with the requested files.

13. The computing system of claim 11, wherein the one or more processors are further configured to:
   re-order an original sequence for the one or more files from the list of N files to be restored based upon, at least in part, the file restoration sequence.

14. The computing system of claim 11, wherein the file location data associated with the one or more files from the list of N files to be restored includes data describing a location of the one or more files in a data stream at the archive storage device.

15. The computing system of claim 11, wherein the file location data includes file placement offset data associated with the one or more files from the list of N files to be restored, and wherein determining the file restoration sequence for the one or more files from the list of N files to be restored is based upon, at least in part, the file placement offset data.

16. A system for increasing speed of a file restore from an archive storage device, the system comprising:
   a data stream at the archive storage device;
   a computing device that receives a list of N files to be restored from the data stream at the archive storage device in response to restore requests;
   a metadata stream at the archive storage device, wherein the computing device receives file placement offset data from the metadata stream, the file placement offset data associated with one or more files from the list of N files to be restored; and
   a file restoration sequence for the one or more files from the list of N files to be restored, the file restoration sequence determined based upon, at least in part, the file placement offset data, wherein the computing device comprises instructions to reorder the file restoration sequence to reduce a number of restore requests, by joining file fragments having an adjacent location at the archive storage device, wherein the speed of the file restore is increased by reducing time for restoring files by $(N-M)*T_{latency}$, wherein N files are being restored, wherein the N files are distributed into M blocks, wherein $T_{latency}$ is time to access data being restored.

* * * * *